United States Patent [19]

Ramsauer

[11] Patent Number: 5,190,648
[45] Date of Patent: Mar. 2, 1993

[54] WATER PURIFYING METHOD AND APPARATUS

[76] Inventor: Larry R. Ramsauer, 642 Giguere Ct., San Jose, Calif. 95133

[21] Appl. No.: 504,126

[22] Filed: Apr. 3, 1990

Related U.S. Application Data

[63] Continuation-in-part of PCT/US89/05068 filed Nov. 9, 1989, which is a continuation-in-part of Ser. No. 269,869, Nov. 10, 1988, abandoned.

[51] Int. Cl.$^5$ .............................. C02F 1/48; C02F 1/78
[52] U.S. Cl. ..................... 210/172; 210/192; 210/196; 210/220; 210/223; 210/256; 210/416.1; 210/461; 261/6; 261/DIG. 42
[58] Field of Search ............... 210/169, 181, 182, 184, 210/188, 209, 256, 259, 416.2, 760, 766, 123, 130, 695, 223, 172, 192, 205, 220, 196, 457, 459, 461, 416.1; 261/5, 6, 123, DIG. 42

[56] References Cited

U.S. PATENT DOCUMENTS

| | | | |
|---|---|---|---|
| 386,909 | 7/1888 | Wise | 210/459 |
| 767,196 | 8/1904 | Zerbe | 210/192 |
| 888,967 | 3/1904 | Dewey | 261/6 |
| 1,124,601 | 1/1915 | Franklin | 210/192 |
| 1,401,620 | 12/1921 | Loubet | 210/459 |
| 1,676,268 | 7/1928 | Lipscomb | 210/130 |
| 2,206,358 | 7/1940 | Koinzan | 210/130 |
| 2,678,728 | 5/1954 | Spodig | 210/223 |
| 2,939,830 | 6/1960 | Green et al. | 210/695 |
| 3,006,476 | 10/1961 | Halpert | 210/169 |
| 3,278,034 | 10/1966 | West | 210/287 |
| 3,692,180 | 9/1972 | LaRaus | 210/188 |
| 3,785,494 | 1/1974 | Sama | 210/459 |
| 3,841,999 | 10/1974 | Bennett et al. | 210/169 |
| 3,879,290 | 4/1975 | Arnot, Jr. | 210/110 |
| 4,043,913 | 8/1977 | Hintermeister | 210/192 |
| 4,141,830 | 2/1979 | Last | 210/192 |
| 4,333,834 | 6/1982 | Werner | 210/220 |
| 4,349,434 | 9/1982 | Jaworski | 210/169 |
| 4,391,703 | 7/1983 | Crosby | 210/220 |
| 4,504,387 | 3/1985 | LeMire et al. | 210/101 |
| 4,507,253 | 3/1985 | Wiesman | 210/760 |
| 4,549,997 | 10/1985 | Verner et al. | 210/221.2 |
| 4,555,335 | 11/1985 | Burris | 261/DIG. 42 |
| 4,640,783 | 2/1987 | Kern | 210/169 |
| 4,749,493 | 6/1988 | Hicks | 210/169 |
| 4,778,595 | 10/1988 | Sable et al. | 210/123 |
| 4,780,217 | 10/1988 | Petersen | 210/221.2 |
| 4,795,557 | 1/1989 | Bourbigot et al. | 210/221.2 |

Primary Examiner—Stanley S. Silverman
Assistant Examiner—Christopher Upton
Attorney, Agent, or Firm—Limbach & Limbach

[57] ABSTRACT

A method and apparatus for purifying a reservoir of water is disclosed employing an elongated lift tube suspended in a water tank for conveying water from and into the reservoir and introducing an air stream containing ozone in the bottom of the lift tube for causing passage of water through a filter into the lift tube upward movement of the water in the lift tube for purifying the water. Magnets (448) with their north poles facing one another are placed on opposite sides of the water received in the lift tube and ozone is diverted into water that is pumped into the reservoir.

13 Claims, 2 Drawing Sheets

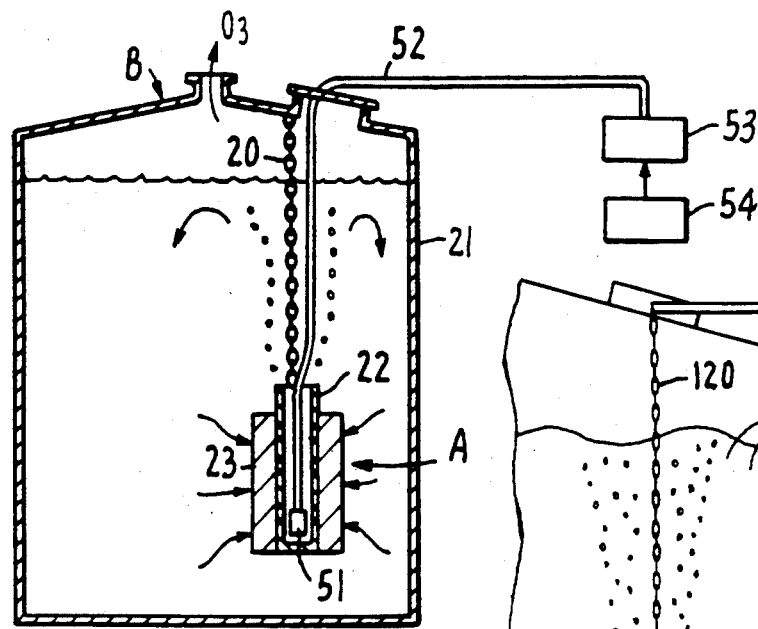
FIG.1.
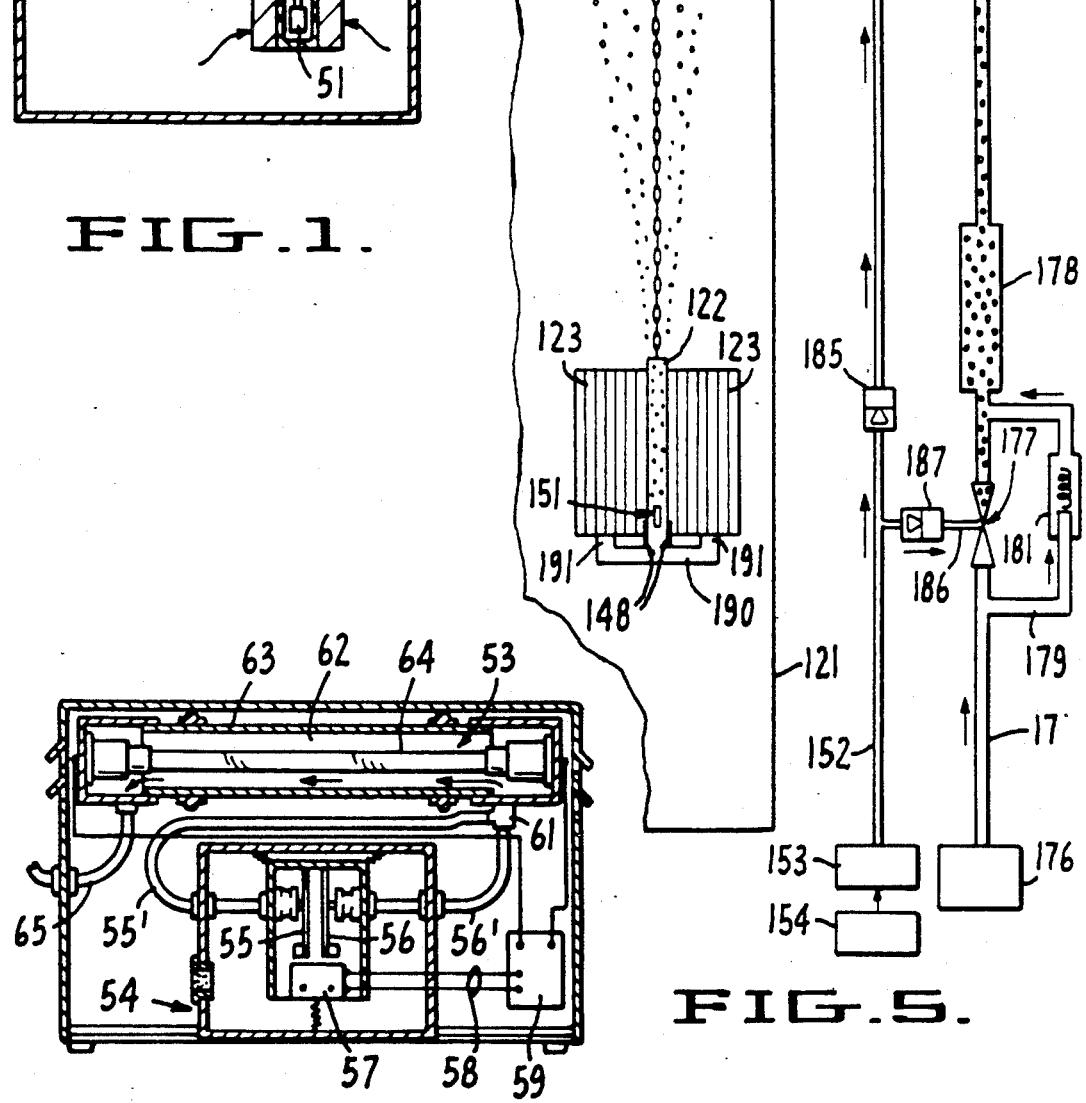
FIG.2.
FIG.5.

WATER PURIFYING METHOD AND APPARATUS

This application is a continuation-in-part of copending PCT application PCT/US89/05068 filed Nov. 9, 1989 (designating the United States) which is in turn a continuation-in-part of U.S. patent application Ser. No. 269,869, filed Nov. 10, 1988, now abandoned.

This invention relates in general to water purifying method and apparatus and more particularly to method and apparatus of purifying a reservoir of water utilizing an airstream containing ozone to purify and circulate the water.

BACKGROUND OF THE PRESENT INVENTION

Ozone ($O_3$) is a gas with strong oxidation properties that has been used for domestic water purification in Europe since the late 1800's. Ozone is produced by high-intensity ultraviolet (U.V.) light or by high-voltage electric field. The only by product of ozone is oxygen ($O_2$). Ozone is created when either U.V. or corona discharge (C.D.) is applied to oxygen. The oxygen disassociates into single O's and recombines into ozone. Ozone has a half life of about 2 to 12 hours in air and about 20 minutes when dissolved in water. Ozone is 13 times more soluble in water than oxygen. Ozone oxidizes and disinfects and deodorizes. Ozone also microfloculates iron, aluminum, magnesium, and calcium, kills bacteria 3,000 times faster than chlorine, kills virus, algae spores, and parasites, precipitates heavy metals, controls formation of scales, and oxidizes oils. Ozone also has a fresh smell like that of an electrical storm.

Typical ozone application into water to be purified has been provided by a venturi eductor used in conjunction with a water pump. Passing water through a venturi educator creates a suction which draws in ozone and mixes the ozone with water. The ozone is introduced into the tank and bubbles up through the tank and out the top of the tank. This same type of system has been used in swimming pools and spas, introducing the ozone into the pool or spa. In some cases, spa applications have used existing "spa hydrotherapy jets" as the means to "suck in" the ozone gas and mix the gas with the spa water.

SUMMARY OF THE INVENTION

Broadly stated the present invention is directed to a purifying method and apparatus in which ozone is generated and injected into the bottom of a lift tube suspended in a reservoir wherein the ozone aids in inducing the flow of water in the lift tube at the same time that the water is purified.

In accordance with a principal aspect of the present invention the ozone is injected into the water in an airstream and the airstream causes the water to flow upwardly in the lift tube and circulate from the reservoir through the lift tube for purification.

In accordance with still another aspect of the present invention a filter is provided in the path of water into and up the lift tube such as coaxial with and surrounding the lift tube for filtering the water going to the lift tube thereby combining water filtration with water purification in a single system.

In accordance with still another aspect of the present invention magnets are provided with their north poles opposing one another on opposite sides of the water stream entering into the bottom of the lift tube.

In accordance with another aspect of the invention when water is being pumped into the reservoir, ozone is diverted and mixed with the incoming water to purify the incoming water.

The foregoing and other objectives, features and advantages of the invention will be more readily understood upon consideration of the following detailed description of certain preferred embodiments of the invention, taken in conjunction with the accompanying drawings.

DESCRIPTION OF THE DRAWINGS

FIG. 1 is a schematic side elevational view, partially in section of a preferred embodiment of the present invention.

FIG. 2 is a schematic side elevational, sectional view, partially broken away, illustrating parts of the system illustrated in FIG. 1.

FIG. 5 is a schematic elevational, section view of the preferred embodiment operating with a well pump.

DESCRIPTION OF THE PREFERRED EMBODIMENT

Figure 3:
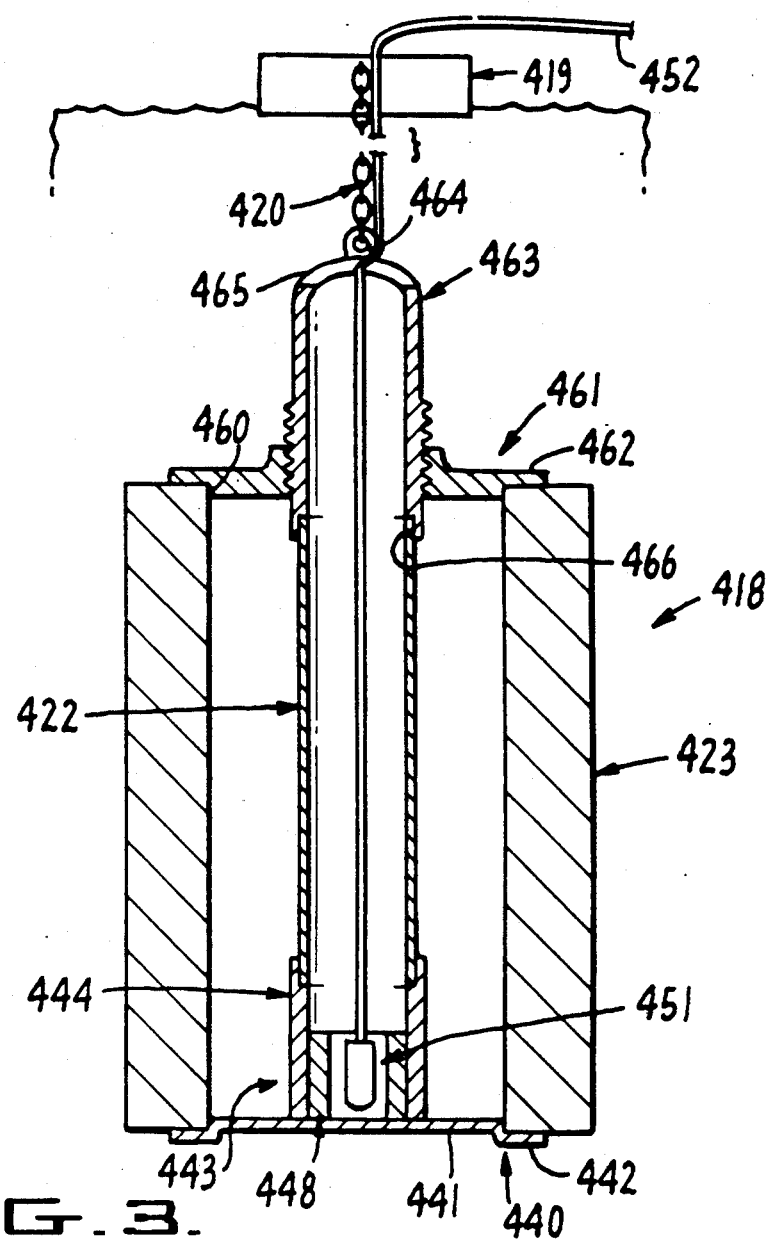
FIG. 3 is a foreshortened elevational sectional view of a preferred construction for the suspended portion of the structure shown in FIG. 1.

While the present invention is applicable to different types of water reservoirs, the preferred embodiment is particularly adapted for use with water tanks fed by a well for purifying and filtering the water in and entering the tank.

Referring now to FIGS. 1 and 2 there is shown a preferred embodiment of the present invention of the water purifying apparatus A applicable for purifying and filtering the water in a home well system utilizing a storage tank.

As shown in FIG. 1, the water purifying apparatus A for the water storage system B includes a perforated lift tube 22 which is suspended inside a water tank 21 from the top thereof such as by a chain 20 and a hollow cylindrical filter cartridge 23 coaxially surrounds the perforated lift tube 22. Ozone from an air pump 54 and ozone generator 53 is pumped through a tube 52 to a diffuser 51, such as a hollow porous ceramic, plastic or metal in the bottom of the lift tube 22. The ozone bubbles up through the water in lift tube 22 and the tank 21 and can escape through the top of the water tank 21.

The ozone generator 53 and air pump 54 are contained in a common cabinet illustrated in FIG. 2. Referring now to FIG. 2 the air pump 54 is a twin bellows type including a pair of bellows 55 and 56 operated by a drive motor 57 electrically connected to power leads 58 which also connect to ballast 59 for the ozone generator 53. The bellows 55 and 56 are connected to tubing 55' and 56' which are connected to a T 61 for pumping air into one end of a cavity 62 inside the housing 63 of the ozone generator 53. An ultraviolet lamp 64 is mounted in the cavity 62, and the airstream radiated by the ultraviolet lamp 64 and containing ozone is drawn from the end of the housing 63 opposite the T 61 by a tube 65 which is in turn connected to the tube 52 extending to the diffuser 51.

In the operation of the purifying system, air is pumped from the pump 54 out tubes 55' and 56' to the T 61 and then through the cavity 62 of the ozone generator 53. Ultraviolet light from source 64 creates ozone in the airstream, and the airstream containing ozone is carried via tube 65 and through tube 52 to the diffuser 51 where the air bubbles and ozone percolate up through the water in the lift tube 22 and then through the water above the lift tube. This air flow causes circulation of water through the filter 23 into the lift tube 20 and up lift tube 20 and toward the surface.

The ozone oxidizes, disinfects, and deodorizes the water. The ozone microfloculates iron, aluminum, magnesium, and calcium, kills virus and bacteria, algae spores, and parasites, precipitates heavy metals, controls formation of scales and oxidizes any oils in the water.

For homes that are on a well system utilizing a water storage tank, installation of any system that requires either draining the tank and/or cutting into existing plumbing can be expensive to install and be an impediment to a sale. For such applications a "drop-in-place" system such as that shown in FIG. 1 will provide water purification and filtering.

The filter module assembly hangs directly inside the holding tank; alternately, it can hang from a float in the holding tank. No expensive water pumps are required. Water pumps are not only expensive to purchase but also consume a lot of electricity and therefore are costly to operate. The system enjoys very high efficiency. It operates 24 hours/day, circulating, filtering and purifying about 10 gallons per minute (over 14,000 gallons per day) and operates at about an electrical cost of $5.00 per month.

Service is extremely simple—the filters are simply pulled up through the tank manhole and hosed off. The diffuser is cleaned by soaking in a gallon jug of swimming pool muriatic acid for about a minute as the filters are hosed off.

The in-the-tank filter module prefilters the water prior to the ozone contact, increasing the ability of the ozone to do its job. The ozone gas mixing and filtration and circulation are accomplished within the filter module assembly.

Once the ozone gas leaves the lift pipe, the ozone bubbles continue to rise up through several feet of water, the bubbles expand and the column of bubbles expands, greatly increasing the volume of water exposed to the ozone and really increasing the water circulation inside the holding tank such that there are no "dead" spots of water inside the tank. All the water in the tank becomes exposed to the ozone gas and to the filtration.

Figure 4:
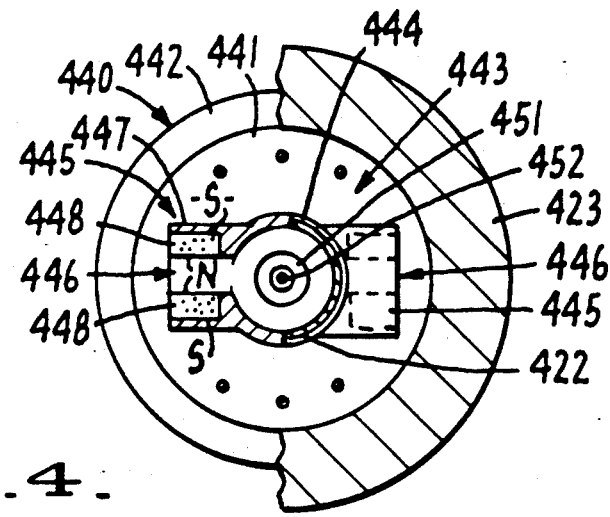
FIG. 4 is a transverse sectional view of the lower end of the structure shown in FIG. 3 rotated 90 degrees and partially broken away.

FIGS. 3 and 4 illustrate preferred features to be included in the embodiment of the well system of FIG. 1 wherein the ozonating and filtering structure 418 is suspended in a water tank by a float 419 and a chain 420. The ozonating structure 418 includes a hollow cylindrical filter 423, the open ends of which are clamped closed by a base member 440 and a top member 460 so that water is filtered as it is drawn through the filter 423 into the interior of the ozonating structure 418. The base member 440 includes a circular base plate 441 which has a peripheral portion 442 which engages the bottom of the filter 423 and also includes a base housing 443 positioned within the filter 423. The base housing includes an upwardly projecting tube socket 444 and a pair of lateral extensions 445 each of which includes an opening 446 and a pair of pockets 447 on opposite sides of the opening 446, each pocket receiving a magnet 448, such as a ceramic magnet. The magnets are positioned with their north poles facing and opposing one another across the opening 446.

The top assembly 460 includes a top circular centrally threaded nut 461 with a flat peripheral portion 462 that bears against the upper end of the filter 423. A top hanger member 463 includes a threaded portion which extends through the nut 461, a hanger hook 464 at the top connected to the chain 420 and apertures 465 in the top permitting fluid flow upwardly there through. The lower end of the top hanger 463 includes a tube socket 466 in which is fixedly secured the top end of an imperforate lift tube 422, the bottom of which is fixedly secured in the tube socket 444 of the base member 440 so that the base member 440 with the lift tube 422 attached thereto can be inserted through the filter 423 and the top nut 461 screwed on to the top hanger 463 to clamp the lift tube centrally within the filter 423. A tube 452 leading from an ozone generator is connected to the float 419, the chain 420 and extends through the opening 465 in the top assembly 460 down to a diffuser 451 located centrally of the base housing 443. Ozone is pumped through tube 452 to the diffuser 451 and ozone bubbles up through the water in the lift tube 422 and the tank and can escape through the top of the water tank. The flow of ozone draws water through the filter 423 and into the openings 446 in the base housing 443. It has been discovered that the opposing north poles of magnets 448 drastically increase the oxidation reduction potential of the ozone in the water.

FIG. 5 illustrates another preferred feature of the invention which would be incorporated in a well water system as shown in FIG. 1 and in which the water pipe feed to the water tank 21 from the underground well pump of the home well water and storage system incorporates provision for ozonating water that is pumped into the water tank 21. As shown, a pipe 135 is connected to the well pump 176 for conveying water through a venturi eductor 177, then through an enlarged pipe section 178 acting as a mixing chamber for delivering well water into tank 121. A bypass pipe 179 is provided for bypassing the venturi eductor 177 and includes an 8 psi bypass spring-loaded valve 181.

The ozone line 152 from the air pump 153 and ozone generator 154 to the water tank 121 is provided with a 0 psi check valve 185. Upstream of the check valve 185 the compressed ozone line 152 is connected via a tube 186 through 6 psi check valve to the venturi eductor 177.

As shown in FIG. 5, the bottom of the lift tube 122 is connected to a cross tube 190 which is in turn connected to a pair (or more) of upwardly projecting perforated tubes 191 on which and around which the filter canisters 123 are positioned so that water flow is in through the canisters 123, down pipes 191 to cross pipe 190 and up through the lift tube all caused by reason of the air flow upwardly in the lift tube from the diffuser 151. The magnets 148 with their north poles facing one another are positioned around the bottom of the lift tube 122.

While the ozonation of the water within the water tank 121 occurs continuously while the air pump 153 and ozone generator 154 operate 24-hours a day, the assembly shown in FIG. 5 permits ozonation of the water from the well to the water tank which occurs only on demand.

The pressurized well water in pipe 175 is directed into the venturi eductor 177 which creates a gas suction (vacuum) on the ozone line through tube 186 and check valve 187. Because well pumps can produce more water volume and pressure than the eductor 177 can handle, the bypass line 178 allows excess well water to bypass the eductor and maintains a constant pressure drop of about 8 psi across the eductor. After the eductor 177, the bypass line 179 is merged with the output eductor and directed into the mixing chamber 178 allowing better mixing of the ozone gas with the bypassed water from which the water proceeds through a length of pipe into the top of the tank 121. The check valve 187 in the tube 186 from the ozone line 152 to the eductor 177 prevents the pressurized ozone gas from constantly entering the eductor when the well pump is off.

When the well pump is turned on, a high vacuum is created by the eductor on the eductor side of the check valve 186 causing that valve to open and drawing substantially all of the ozone into the venturi eductor 177. The second 0 psi check valve 185 prevents the eductor 177 from drawing tank water into the ozone line 152 through the diffuser 151.

Thus, with the well pump on, the flow of ozone gas to the filter module is substantially reduced and often completely stopped. The ozone is directed and mixed into the incoming well water. When the well turns off, the filter module ozonation and pumping resumes.

There are no controls, electrical, electronic or otherwise required to allow the ozone gas to be redirected from the purifier-filter structure into the mixer assembly when the well pump is turned on, thus mixing the ozone into the incoming water automatically. When the well pump turns off, the ozone is automatically redirected back to the purifier filter module inside the holding tank.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

I claim:

1. A purifying system for a reservoir of water comprising, in combination:
   means for generating ozone,
   a lift tube for containing water,
   means for suspending said lift tube in a water tank with the upper end of said lift tube below the surface of the water,
   means for introducing water into said lift tube, a filter located in the path of water flow into said lift tube,
   means for injecting ozone into the water introduced into said lift tube for causing upward movement of water in said lift tube and purifying the water, said means for introducing water into said lift tube including openings at the bottom of said lift tube, said filter surrounding and spaced outwardly from the lift tube and with the ends substantially sealed thereto permitting water to flow through said filter into the bottom of said lift tube,
   magnets on opposite sides of the opening at the bottom of said lift tube, and
   said magnets having their north poles facing one another across the water introduced into the lift tube.

2. A purifying system for a reservoir of water comprising, in combination:
   means for generating ozone,
   a lift tube for containing water,
   means for suspending said lift tube in a water tank with the upper end of said lift tube below the surface of the water,
   means for introducing water into said lift tube, a filter located in the path of water flow into said lift tube,
   means for injecting ozone into the water introduced into said lift tube for causing upward movement of water in said lift tube and purifying the water,
   means for pumping water into a water tank in which said lift tube is suspended,
   and means for directing ozone from ozone injecting means into said water pumping means for ozonating water being pumped into the water tank.

3. The purifying system of claim 2 wherein said water pumping means includes a mixing chamber wherein ozone and water are mixed before being introduced into the water tank.

4. The purifying system of claim 2 wherein said ozone directing means includes a venturi eductor.

5. A purifying system for a water tank supplied with water from a well comprising, in combination:
   means for generating ozone,
   a lift tube for containing water,
   means for suspending said lift tube in a water tank with the upper end of said lift tube below the surface of the water,
   means for pumping water into the water tank,
   means for passing water within the water tank into said lift tube,
   a filter located in the path of water flow into said lift tube,
   means for injecting ozone into the water in said lift tube for causing upward movement of water in said lift tube and purifying the water, and
   means for directing ozone from ozone injecting means into said water pumping means only when water is being pumped into the tank by said water pumping means.

6. The purifying system of claim 5 wherein said lift tube includes perforations and said filter is coaxial with and surrounding said lift tube around said perforations.

7. The purifying system of claim 5 wherein said means for introducing water into said lift tube includes openings at the bottom of said lift tube and said filter surrounds and is spaced outwardly from the lift tube and the ends substantially sealed thereto permitting water to flow through said filter into the bottom of said lift tube.

8. The purifying system of claim 7 including magnets on opposite sides of the opening at the bottom of said lift tube, said magnets having their north poles facing one another across the water introduced into the lift tube.

9. The purifying system of claim 5 wherein said means for generation ozone includes an airstream diffuser positioned near the bottom of said lift tube, an ozone generator, an air pump, and means for conveying an airstream from said air pump to said ozone generator for generation of ozone in the airstream and for conveying said airstream containing ozone from said ozone generator to said diffuser for diffusion into water contained within said lift tubes.

10. The purifying system of claim 5 wherein said water pumping means includes a mixing chamber wherein ozone and water are mixed before being introduced into the water tank.

11. The purifying system of claim 5 wherein said ozone directing means includes a venturi eductor.

12. The method of purifying water in a water reservoir comprising the steps of:
- suspending a vertical lift tube below the surface of the reservoir,
- taking water from the reservoir and supplying it to the lower end of vertical lift tube,
- providing passage of water within the reservoir through a filter into said lift tube,
- providing a stream of air under pressure,
- producing ozone in said pressurized stream of air,
- introducing said pressurized stream of air in the water near the bottom of said lift tube to cause flow of ozone up the lift tube and water through the filter and up the lift tube,
- producing a magnetic field between opposed north poles of magnets facing one another across the water introduced into said lift tube.

13. The method of purifying water in a water reservoir comprising the steps of:
- suspending a vertical lift tube below the surface of the reservoir,
- taking water from the reservoir and supplying it to the lower end of vertical lift tube,
- providing passage of water within the reservoir through a filter into said lift tube,
- providing a stream of air under pressure,
- producing ozone in said pressurized stream of air,
- introducing said pressured stream of air in the water near the bottom of said lift tube to cause flow of ozone up the lift tube and water through the filter and up the lift tube,
- pumping water into said reservoir,
- diverting ozone from the produced ozone, and
- mixing the diverted ozone with the water being pumped into said reservoir.

* * * * *